May 7, 1968   J. D. MITCHELL   3,381,455
PEANUT COMBINE
Filed Aug. 13, 1965
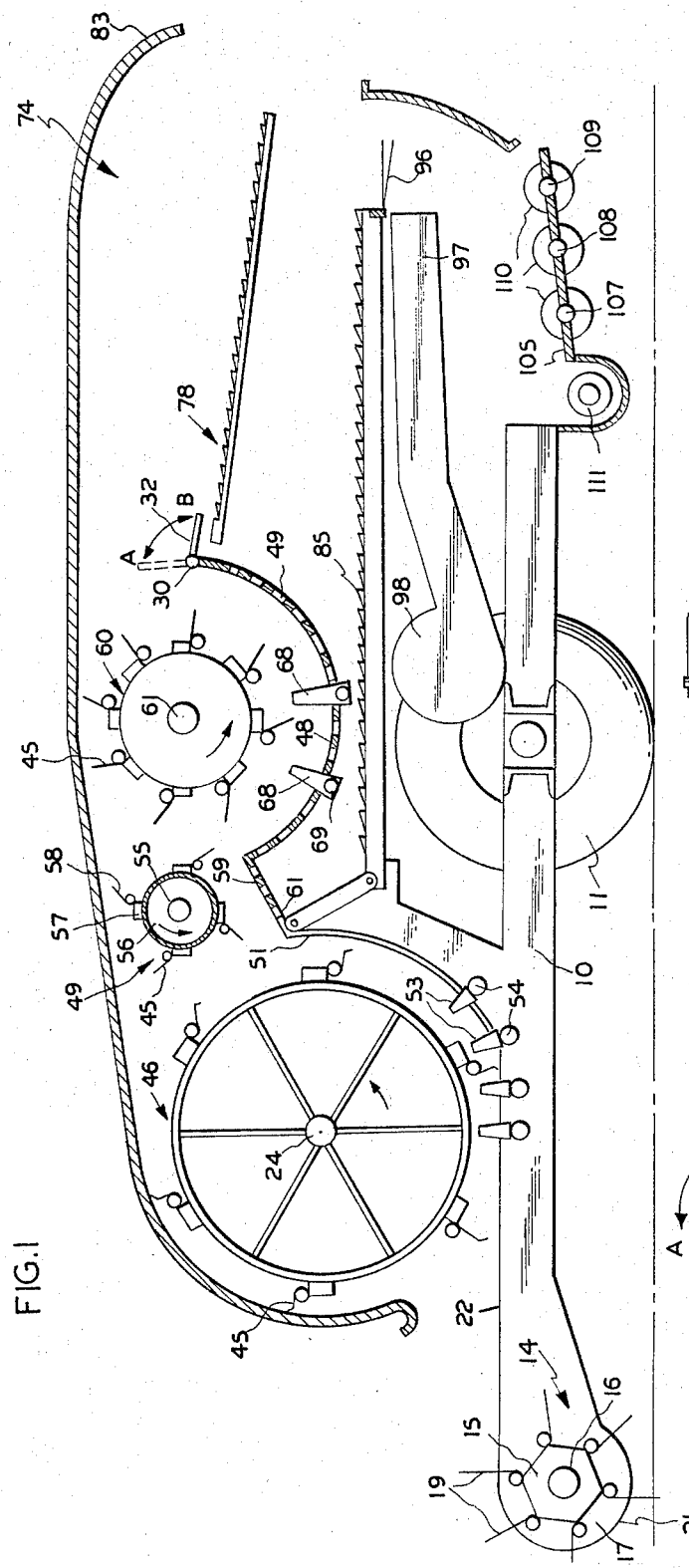
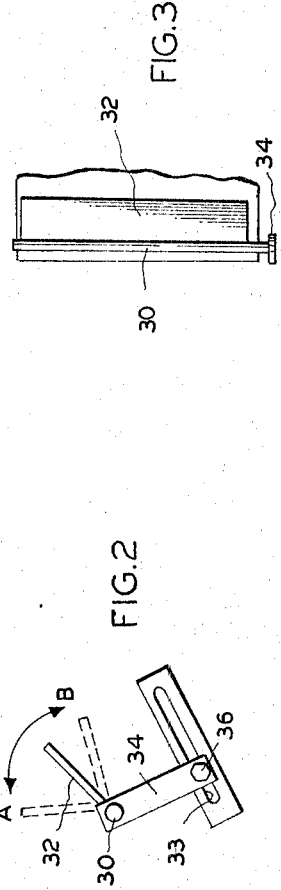

United States Patent Office 3,381,455
Patented May 7, 1968

3,381,455
PEANUT COMBINE
John D. Mitchell, Woodville, N.C., assignor to Harrington Manufacturing Company, Lewiston, N.C., a corporation of North Carolina
Filed Aug. 13, 1965, Ser. No. 479,418
1 Claim. (Cl. 56—19)

The present invention relates to apparatus for threshing agricultural produce such as the detachment and separation of the peanuts from peanut vines and the invention more specifically pertains to improvements in a peanut picking machine adapting such apparatus for efficient operation throughout a wide range in the volume at which the vines with the peanuts thereon are supplied into the machine and throughout a wide range in the moisture content of the vines.

The character of peanut vines varies pronouncedly with the moisture content therein. When the vines are dry they may be readily broken with a force of several ounces. When the vines are damp or when moisture is present several pounds are required to break the vines. In threshing peanuts, the moisture content of the vines being supplied to the machine for separation of the peanuts varies over a wide range. In one area of a field where the soil is light and the vines are small, rapid curing occurs so that the vines have a low moisture content. In other areas of the same field where the soil is heavier or in shaded areas of when the humidity is high, curing takes place at a much slower rate so that the vines have a relatively high moisture content. Accordingly, in any windrow or during feeding of the machine a wide variation of moisture conditions may be encountered. The volume of the vines in any given windrow varies and when the vines are fed into a peanut picking machine the volume varies along with the moisture content of the vines.

There are a number of peanut harvesters on the market and quite a few patents have been granted on peanut combines. In this regard the general characteristics and overall structure of peanut combines may be readily understood by referring to the following representative patents: 1,081,593; 1,164,370; 1,216,149; 1,250,466; 1,360,249; 1,380,449; 1,704,805; 1,749,040; 1,752,375; 1,802,412; 1,935,803; 2,349,262; 2,454,156; 2,788,628; 2,804,077; 2,856,936; 2,974,467; 3,007,475; and 3,156,245.

These prior art peanut combines leave room for improvement insofar as providing a simple, reliable, and inexpensive means for (a) adapting the threshing characteristics of the apparatus to changes in the volume of vines supplied to the combine (b) maintaining the vines within the threshing zone for longer periods and to more effectively remove peanuts from the vines when the moisture content of the vines is unusually high.

It is accordingly an object of the present invention to provide means within a peanut picking machine for adapting the threshing characteristics of the apparatus to changes in the volume of vines supplied into the machine, and to maintain the vines within the threshing zone when the moisture is unusually high so as to provide for more effective removal of peanuts from the vines.

Another object of the invention is to provide an adjustable baffle means adjacent the downstream side of the last threshing cylinder of the peanut combine including means for altering the position of the baffle means with respect to the associated threshing cylinder in response to changes in the moisture content of the vines and in response to changes in the volume of the vines undergoing threshing.

Other objects and features of the invention will be appreciated and become apparent particularly to those skilled in the art to which the invention pertains as the present disclosure proceeds and upon consideration of the following detailed description taken in conjunction with the accompanying drawings wherein an embodiment of the invention is disclosed.

In the drawings:

FIGURE 1 is a longitudinal sectional view substantially on the center line of a peanut combine in accordance with this invention;

FIGURE 2 is an end view of a baffle means in accordance with this invention, including its associated arm, bolt and lock slot, disassociated from any other part of the combine.

FIGURE 3 is a plan view of the baffle means.

Considered from one aspect of the present invention involves a peanut combine comprising in combination:

(a) A vine pick-up located near the earth and having fingers for engaging peanut vines and for conveying them upwardly and rearwardly, (b) At least two threshing cylinders located above and behind said vine pick-up, each threshing cylinder having a plurality of fingers extending outwardly from its periphery, (c) Each threshing cylinder being positioned a relatively short distance away from an arcuate breast plate, (d) Each breast plate having openings therein and at least one of said breast plates having a series of fingers extending through said openings upwardly into the path of movement of the vines and operating in conjunction with the fingers of the nearest threshing cylinder means for detaching the peanuts from the vine, (e) A movable elongated baffle means being positioned immediately adjacent to the downstream edge of the last breast plate, (f) Said baffle means being movable from a first position that presents no impediment to the flow of peanuts and vines to a second position that presents a substantial impediment to the flow of peanuts and vines.

The invention is directed to improvements in a peanut threshing machine which gathers the vines from the ground and such apparatus includes a frame 10 of any desired character and wheels 11 for supporting the machine for rolling movement over a field. The apparatus is adapted to be towed by a tractor or the like connected to tongue means which projects forwardly from the machine and may be connected to a draw bar of a tractor. The hitch serves to maintain the machine in generally horizontal position with a pick-up mechanism 14 in the desired relationship close to the surface of the ground as the machine is moved over a field.

The active elements of the pick-up mechanism 14 includes a shaft 16 which is journalled for rotation and supported by spaced sides plates 17 at the forward end of the machine. The shaft 16 carries a reel structure 15 which includes spring fingers 19 thereon that are designed to engage and pick up the peanut vines that are on the ground. The spring fingers 19 extend through circumferential slots that are formed in an arcuate plate 21. The pick-up mechanism is of conventional construction and operates in the usual manner to elevate the vines with the nuts thereon and deliver them onto the horizontal portion 22 of a bottom plate. Shaft 16 is driven by a pulley (not shown).

The vines with the peanuts thereon are delivered onto the bottom plate 22 and are moved rearwardly in the machine by means of a first threshing cylinder (or reel structure) indicated at 46. A shaft 24 supports the cylinder 46 for rotation on bearings (not shown) mounted at the side walls of the machine. The cylinder 46 may be formed as a skeleton structure having an open interior.

The threshing cylinder 46 rotates in a counter-clockwise direction to carry the vines rearwardly and upwardly over a first breast plate 51 having a plurality of slots (not shown) through which a plurality of spring fingers 53 project and through which dirt (but not peanuts) can fall. The spring fingers 53 are mounted on shafts 54 and these spring fingers knock some of the peanuts from the vine and also prevent the vine from falling back as it is advanced and elevated along the breast plate 51. Shafts 54 are provided with means for adjustment of the spring fingers 53 and the amount they extend above the breast plate 51.

The vines are carried upwardly along the breast plate 51 with some of the peanuts being knocked loose or detached therefrom until the vines and the detached peanuts carried thereby reach the rear of the first threshing cylinder 46, whereafter the peanuts are stripped therefrom by a stripper cylinder 49 which comprises a shaft 55 having a disk 56 at each end. Bars 57 are mounted around the periphery of the discs and bars 57 support spring fingers 58. The spring fingers 58 travel in a counter-clockwise direction in opposition to the travel of the closest adjacent portion of the periphery of the threshing cylinder 46 so as to facilitate stripping the vines from cylinder 46 and thereafter carrying the vines (with the peanuts either on the vines or stripped therefrom) over the central portion 59 (preferably perforated and which can be considered as a separate breast plate or as an extension of the breast plate 51), after which the nuts may drop through openings 61 or pass rearwardly to the breast plate 48. The vines are removed from the stripper cylinder 49 by means of a second threshing cylinder 60 (which is similar to the threshing cylinder 46 and stripper cylinder 49).

The threshing cylinder 60 is mounted on the shaft 61 and is driven by a pulley (not shown). The rear concave portion of the breast plate 48 is preferably provided with pear-shaped openings 49 through which nearly all of the detached peanuts fall. Fingers 68 may be mounted on cross rods 69 and these fingers extend through at least some of the pear-shaped openings and shake loose any peanuts still clinging to the vines. However, the fingers 68 can be omitted if desired. The fingers 68 can assist in preventing the vines from falling back as they are carried upwardly over the breast plate 48. The pear-shaped openings 49 also assist in detaching peanuts from their stems. The shaft 69 is provided with means for adjustment of the fingers 68 and the amount they extend above the breast plate 48.

The vines carried backwardly beyond the breast plate 48 pass onto a vine rack 78 where any remaining nuts left on the vines are detached by shaking. The rack 78 is suspended within the combine housing by means of depending brackets (not shown) and the stripped vines are discharged through the discharge outlet 74 where they will drop upon the ground. The discharge outlet 74 may be provided with a hood or extension 83 curved to deflect the vines earthward.

Peanuts passing through the openings in the rear breast plate 48 will be caught in a pan 85 having a washboard type bottom. The pan 85 is rapidly reciprocated to facilitate the backward movement of the peanuts. The rear extremity of pan 85 is provided with tines 96 to direct stems and light material into a position to be blown out of the machine by means of air under pressure from the discharge end 97 of a blower 98.

Beneath the pan 85 at the rear of the combine are mounted shafts 107, 108 and 109 on each of which are mounted a series of stemmer knives or saws 110 which project through the bottom of the machine and facilitate detaching of the stems from peanuts discharged from the end of pan 85. The peanuts slide forwardly down the incline 105 and fall by gravity into a lateral auger conveyor means 111 for conveying the peanuts to any suitable bag or basket.

The spring fingers 45 of the first threshing cylinder 46, the stripper cylinder 49 and the second threshing cylinder 60 preferably are yieldable rearwardly when they engage the vines to thereby avoid the vines being detained thereon sufficiently to clog the machine.

The portions of the peanut combine described thus far are known (e.g. Patents 2,974,467 and 3,156,245) in the art and for that reason a more specific and detailed description of each element and its operation is not deemed necessary here.

The particular improvement of the present invention resides in the provision of baffle means at the outlet of the second or last threshing section which will function to exert control of the discharge of peanut vines to the vine rack 78. In the drawings this movable elongated baffle means is shown as being positioned immediately adjacent the downstream edge of breast plate 48. The baffle means comprises a shaft 30 that extends laterally across the combine and attached (e.g. by welding) to this shaft 30 is an elongated baffle plate 32. The ends of the shaft 30 are rotatably mounted in the sides of the combine so that the entire baffle means can be moved from position A to position B or to any intermediate position. At least one end of shaft 30 extends outside the combine and is preferably provided with an arm 34 which has a bolt 36 in one end thereof (see FIGURE 2). As the arm 34 and associated bolt 36 are manually moved from one end of slot 33 to the other, the baffle plate 32 will move from position A to position B. Bolt 36 can be used to lock arm 34 in any desired location in the slot 33.

The baffle means of this invention is quite useful to a farmer. When the farmer sees that the vines being discharged from the vine rack thru opening 74 have quite a few peanuts still clinging to the vines, he will know that the threshing cylinders are not performing efficiently, probably due to overloading or high moisture content of the vines. He can easily correct this situation by manually moving the baffle plate 32 closer toward position A. Experience with the combine will permit the farmer to quickly judge just how far the baffle should be moved in order to correct the condition. Movement of the baffle means toward position A in effect causes recirculation of a portion of the vines around threshing cylinder 60 since it makes it more difficult for the spring fingers 45 to push the vines backwardly upon the vine rack 78.

When the farmer sees that the vines coming out of the rear of the combine are substantially free of peanuts he will know that the baffle means is in the proper position. The baffle means 32 should always be as far toward position B as possible (consistent with good stripping of the vines) because unnecessary recirculation of vines will result in the vines being broken up more than is necessary in the last threshing unit. Also the less the recirculation the greater the possible throughput of vines through the combine and the less the likelihood of shelling peanuts.

In conclusion, while there has been illustrated and described a preferred embodiment of my invention, it is to be understood that since the various details of construction may obviously be varied considerably without really departing from the basic principles and teachings of this invention, I do not limit myself to the precise constructions herein disclosed and the right is specifically reserved to encompass all changes and modifications coming within the scope of the invention as defined in the appended claims.

Having thus described my invention, what I claim as new and desire to secure by United States Letters Patent is:

1. A peanut combine comprising in combination:
 (a) a vine pick-up located near the earth and having fingers for engaging peanut vines and for conveying them upwardly and rearwardly,
 (b) at least two threshing cylinders located above and behind said vine pick-up, each threshing cylinder having a plurality of fingers extending outwardly from its periphery, (c) each threshing cylinder being positioned a relatively short distance away from an arcuate breast plate, (d) each breast plate having openings therein and at least one breast plate having series of fingers extending through said openings upwardly into the path of movement of the vines and operating in conjunction with the fingers of the nearest threshing cylinder means for detaching the peanuts from the vine, (e) a movable elongated baffle means being positioned immediately adjacent to the downstream edge of the last breast plate, (f) said baffle means being movable from a first position that presents no impediment to the flow of peanuts and vines to a second position that presents a substantial impediment to the flow of peanuts and vines.

References Cited

UNITED STATES PATENTS

| | | | |
|---|---|---|---|
| 2,974,467 | 3/1961 | Long | 56—19 |
| 3,156,245 | 11/1964 | Hobbs | 130—27 |

RUSSELL R. KINSEY, *Primary Examiner.*